March 31, 1964  J. L. McLUCAS  3,127,610
COLLISION WARNING SYSTEM
Filed June 30, 1960  2 Sheets-Sheet 1

INVENTOR.
JOHN L. McLUCAS
BY
Mitchell & Bechert
ATTORNEY

March 31, 1964  J. L. McLUCAS  3,127,610
COLLISION WARNING SYSTEM
Filed June 30, 1960  2 Sheets-Sheet 2
FIG. 4
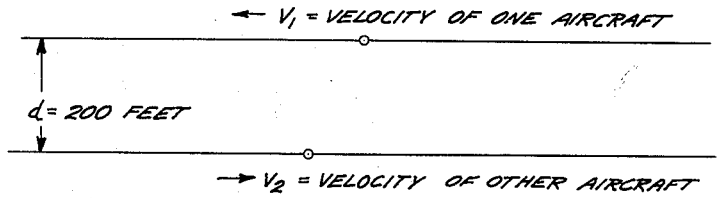
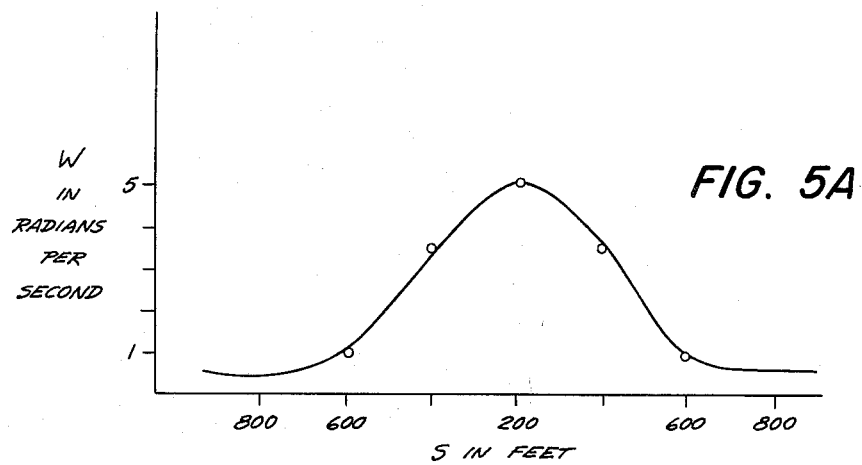
FIG. 5A
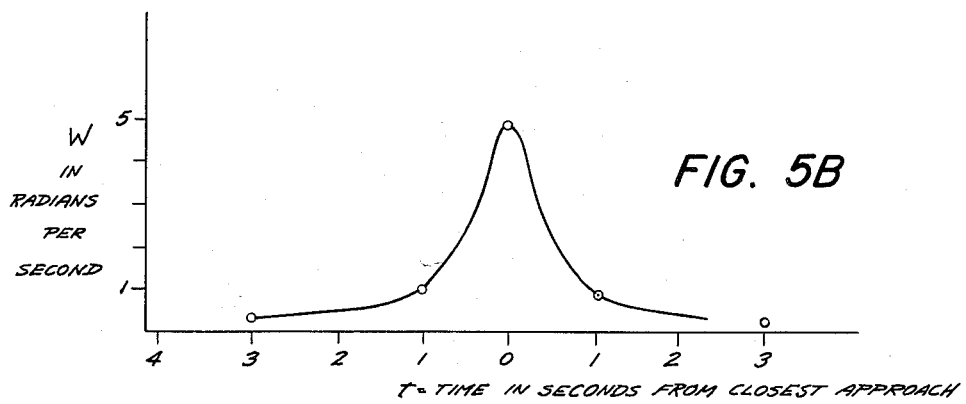
FIG. 5B
INVENTOR.
JOHN L. McLUCAS
BY
*Mitchell & Bechert*
ATTORNEY

United States Patent Office

3,127,610
Patented Mar. 31, 1964

**3,127,610
COLLISION WARNING SYSTEM**
John L. McLucas, Boalsburg, Pa., assignor to HRB-Singer, Inc., State College, Pa., a corporation of Delaware
Filed June 30, 1960, Ser. No. 39,904
2 Claims. (Cl. 343—112)

The invention, generally, relates to vehicular collision warning systems and, more particularly, to a collision warning system adaptable for use with aircraft and the like.

The problem of avoiding collisions between aircraft has received increased attention in recent times because of such factors as the great increase in the volume of air traffic, the increase in speed at which aircraft operate today, and the reduced visibility characteristic of many present-day, streamlined aircraft. While some progress has been made to reduce the probability of collisions near terminal areas, such as airports and areas where air traffic is heavily congested, very little has been accomplished to reduce the probability of collisions along air lanes traveled between these areas.

Since the increase in the volume of air traffic is not limited to military and commercial type aircraft but includes also an increase in the volume of traffic in private aircraft, a practical collision warning system must be technically uncomplicated, repeatedly reliable, relatively inexpensive and low in weight.

Accordingly, it is an object of the invention to provide a collision warning system which overcomes the disadvantages of previously known systems and is operable with all types of vehicles, particularly aircraft.

It is also an object of the invention to provide a vehicular collision warning system to avoid collision between vehicles traveling on constant bearing collision courses.

A further object of the invention is to provide a collision warning system adaptable for use on all types of aircraft to warn an aircraft on a collision path with another aircraft.

A still further object of the invention is to provide an air collision warning system which indicates the presence of another aircraft, that the aircrafts are in collision courses, and a visual indication of the direction of one aircraft relative to the other.

Generally, one form of the warning system of the invention includes a transmitter for installation in one vehicle to emit signals at a predetermined frequency and a means for installation in another vehicle to receive the signals at repeated intervals. A suitable means is connected with the receiver to compare intervals between received signals. Upon coincidence in intervals between signals, a utilization circuit warns of impending collision and, if desired, makes an automatic change in course to avoid collision.

The above and other objects and advantages of the invention will be understood better from the following detailed description of a preferred embodiment taken in conjunction with the accompanying drawings, in which:

FIG. 4 is a schematic illustration of two aircraft passing on parallel courses;

FIG. 5A is a graph showing a plot of the rate of change of signal frequency in radians per second with respect to the number of feet separating the two aircraft shown in FIG. 4; and FIG. 5B is a graph showing a plot of signal frequency in radians per second with respect to time in seconds.

As mentioned previously, the situation with which the warning system of the invention is concerned is remote areas where ground controlled systems are not available, such as along air lanes between terminals. In this situation, there are basically two instances where collision may occur: first, when the distance between the paths of two aircraft is zero as in a head-on approach; and second, when the paths of two aircraft are convergent.

It will be noted that in each of these instances of impending collision mentioned above, the bearing of one aircraft relative to the other is constant. Therefore, the principle upon which the system of the invention operates is to sense whether or not aircrafts are maintaining a constant bearing relative to each other, and, if so, to warn the pilots in time to permit a change of course to be made or, alternatively, to change the course automatically.

In contrast, the principle upon which various known systems operate involves the measurement of range, or distance, between aircraft, and if the range is decreasing or if the range becomes less than a minimum safe value, a warning is given. An important disadvantage inherent in these prior systems is realized when two aircraft are approaching on convergent paths, but one aircraft is traveling at a higher speed than the other. In accordance with the prior systems, a warning would be given since the range is decreasing.

However, due to the greater speed of one aircraft relative to the other, the one aircraft would pass the point of intersection of the convergent paths before the other aircraft arrives at this point. If a warning is given in this instance, one aircraft may change its course directly into the other aircraft.

In accordance with the system of the invention, however, no warning is given unless the bearing of one aircraft relative to another aircraft is substantially constant.

Figure 1:
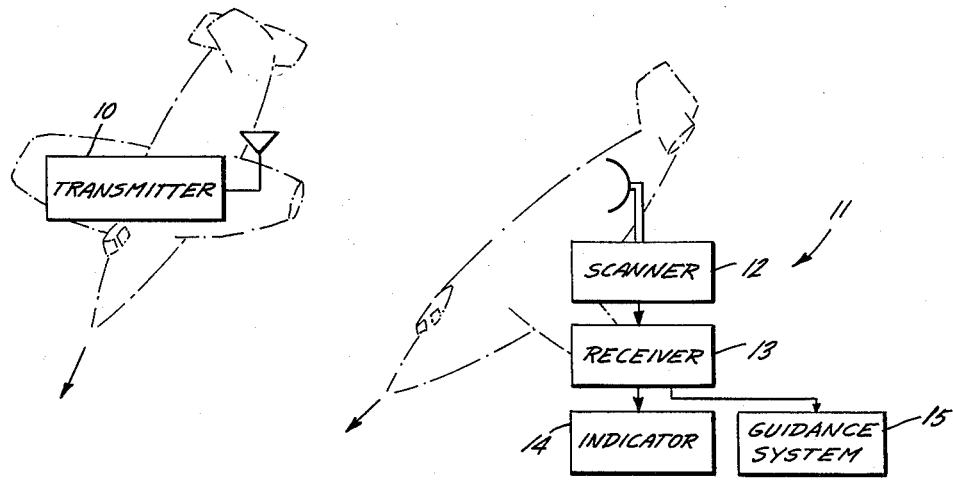
FIG. 1 is a block diagram showing the interconnection of the respective components embodied in the system of the invention.

As seen in FIG. 1 of the drawings, a transmitter 10 is installed in one aircraft and a means 11 to receive transmitted signals is installed in another aircraft. Of course, both aircraft in the illustration normally would have both a transmitter and a receiver means.

The transmitter 10 may be any of several types including one adapted to transmit light (visible, infrared, ultraviolet, etc.) or it may be a conventional radio transmitter which transmits a signal having a predetermined frequency which can be identified by the receiver means 11, which includes signals of continuous tone as well as modulated signals.

The receiver means 11 includes a scanning antenna 12 (electrical or optical), a receiver 13 and a suitable indicator 14. As will be described presently, the output of the receiver 13 may be connected directly to the automatic guidance system 15 for the vehicle.

The antenna or reflector-and-detector system 12 is highly directional so that the receiving means 11 can discriminate accurately in angle as to the direction of arrival of the transmitted signal as the antenna rotates. The "beamwidth" or acceptance angle is of the order of a few degrees in the horizontal plane and five to ten degrees in the vertical plane. In other words, the directivity is sharper in the horizontal plane than it is in the vertical plane.

Figure 2:
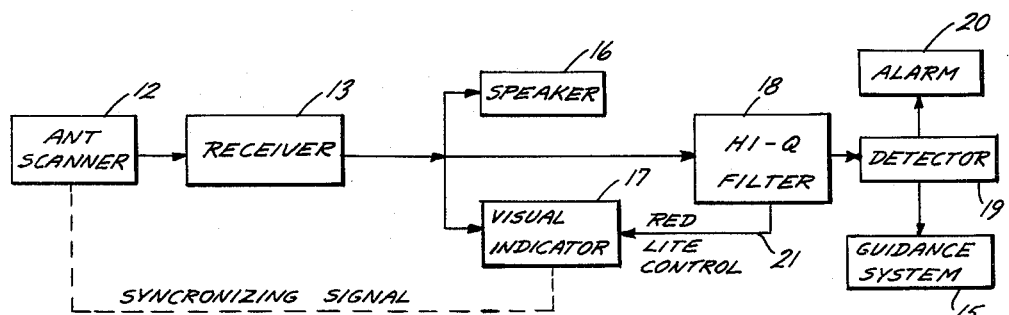
FIG. 2 is a block diagram showing the interconnection of the respective components for the receiver portion of the system of the invention.

Further details of the receiver means 11 are illustrated in FIG. 2 of the drawings. The signals received by the rotating scanner 12 are amplified by the receiver 13 and used to provide three different types of indication.

First, the output of the receiver 13 is coupled to an audio speaker 16 which emits a clicking sound with a fundamental repetition rate equal to the antenna scanning rate when a target is close enough to produce an audible signal. Therefore, the arrival of signals at the speaker 16 is merely an indication that the system is working properly and that some target exists within the field of view of the system.

Second, the output of the receiver 13 is coupled also to a visual indicator 17. An illustration of one form of visual indicator 17 is a stroboscopic light which is turned on whenever a signal is received. A rotating disc (not shown) in the visual indicator 17 is synchronized, either mechanically or electrically, with the antenna scanner 12 so that the disc rotates at the same rate as the antenna scanner. The disc is opaque except for a translucent or transparent wedge-shaped portion. Thus, as the scanning system rotates the visual indicator rotates in synchronism with it, and the direction from which a signal is received is displayed visually on the indicator as a wedge of light at a particular angle.

Third, the output of the receiver 13 is coupled to a high-Q filter 18 which is tuned to the exact frequency at which the antenna scanner 12 rotates. Therefore, the only signals that can pass through the filter 18 are those which arrive on the identical frequency at which the system is scanning. In other words, the only signals which will have the correct frequency to pass the filter 18 are those which arrive from targets whose bearing with respect to the subject aircraft is constant. All other received frequencies will be either slightly too high or slightly too low to pass through the filter 18.

Those signals which are of the correct frequency to pass through the filter 18 will be detected by a suitable detector 19 and will be used to actuate an alarm 20 which is either visual or audible. Also, the signals from the detector 19 may be applied directly to the automatic guidance system 15 to alter the course of the subject aircraft automatically.

If desired, the color of the light of the visual indicator 17, may be indicative of a desired situation. For example, the light may be blue or green to indicate presence of a target, and the output of the filter 18 may be connected to the visual indicator 17 by means of a connection 21 to change the indicator light to another color, such as red, to indicate a warn of a collision course.

The above described system is primarily for the detection of a single target. However, the above system is adaptable also to detect multiple targets.

For this purpose, it is necessary to replace the high-Q filter 18 and the alarm 20 with one which can respond to more than one signal at a time. For example, a multiple filter system may be substituted for the single filter 18, and these filters are operated in sequence and are arranged for switching back and forth between the respective filters.

Figure 3:
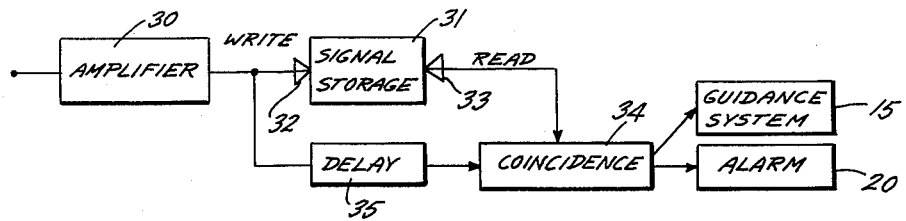
FIG. 3 is a block diagram showing the interconnections between circuit components to determine constant bearing in accordance with the invention.

Another illustration of an arrangement responsive to multiple targets is shown in FIG. 3 and includes a magnetic drum 31 which rotates in synchronism with the antenna scanner 12 (FIG. 2). The output of the receiver 13 is amplified by a suitable amplifier 30 and is used to write on the magnetic drum 31 whenever a signal is received. Just behind the magnetic writing head 32 is a reading head 33 which picks up signals from the drum and connects the signals to a coincidence circuit 34.

A delay circuit 35 is connected between the output of the amplifier 30 and the coincidence circuit 34 to cause signals from the receiver 13 to arrive at the coincidence circuit 34 at the same time as signals from the reading head 33. The signals passing through the coincidence circuit 34 are utilized, for example, by the alarm 20 and, if desired, by the guidance system 15.

The drum described above may be set up in such a way that the signal level which is built up on the drum is a function of how many times the signal has been allowed to reach the drum. After a certain number of drum rotations, the signal will have reached a sufficient level to actuate the coincidence circuit and to activate the alarm. A periodic erase can be built into the system so that the drum 31 does not build up gradually with noise signals.

To illustrate the operation of the system of the invention in detecting a target, assume that two aircraft are meeting on parallel courses which pass within 200 feet of each other, as illustrated in FIG. 4 of the drawings. If the two aircraft are traveling in opposite directions, their velocities will be additive relative to each other, and in this instance, assume that the sum of the velocities is 1,000 feet per second, which is a typical case for two medium performance aircraft.

Assume further that the antenna signal is operating at 60 scans per second. The signals received at the output of the high-Q filter when the aircraft are some distance apart will be received at very nearly 60 cycles per second. However, as the aircraft approach each other, the received signals become strong enough to actuate the indication system. The received signal will increase gradually in frequency until, at the point of nearest approach, the signal is very nearly 61 cycles per second.

The rate of change of signal frequency is illustrated graphically in FIG. 5 of the drawings, and it can be seen that a range of 6,000 feet (that is, 6 seconds before a potential collision could occur) the frequency of the signal is 60.03 cycles per second. Therefore, in order to distinguish the 60.03 cycles per second from 60 cycles per second, the Q of the filter must be approximately 2,000. Such Q's are available in mechanically resonant filters involving piezoelectric, magnetostrictive, or tuning fork characteristics.

While the invention has been described and illustrated by specific examples, it is understood that modifications and alterations may be made without departing from the true spirit and scope of the invention as set forth in the following claims:

I claim:

1. A vehicle collision warning system comprising a transmitter for installation in one vehicle to emit signals at a predetermined frequency, a receiver for installation in another vehicle, a directional scanner means connected with the receiver to couple a signal to the input of the receiver, means adapted to rotate said scanner means at a second predetermined frequency, audio means connected with the output of the receiver to provide audible sound responsive to signals received to indicate the presence of said one vehicle, a high-Q filter means connected to the output of the receiver to pass signals of said second predetermined frequency, an audible alarm responsive to the output of the filter means to indicate the bearing of said another vehicle is constant relative to said one vehicle and that collision is impending, an automatic guidance system responsive to the output of the filter means to alter the course of said another vehicle automatically, and a visual indicator responsive to the output of the filter means to show the direction of said signals.

2. A vehicle collision warning system comprising a transmitter in one vehicle to emit signals at a predetermined frequency, a directional rotary antenna mounted in another vehicle, a receiver in said another vehicle to receive said signals from said antenna including means for rotating said antenna at a predetermined scan frequency, a high Q filter coupled to the output of said receiver, said filter being adapted to pass signals at said predetermined scan frequency, a stroboscopic visual angle indicator coupled to the output of said receiver and to said antenna rotating means to produce a visual indication of the relative bearing between said vehicles, audio means coupled to the output of said receiver and operable to produce audible sounds in response to signals received therefrom to indicate the presence of said one vehicle, and utilization circuit means coupled to the output of said filter and responsive to signals from said filter to warn of an impending collision of said vehicles.

References Cited in the file of this patent

UNITED STATES PATENTS

| | | |
|---|---|---|
| 2,468,109 | Richardson et al. | Apr. 26, 1949 |
| 2,933,726 | Campbell et al. | Apr. 19, 1960 |
| 2,957,082 | Plass | Oct. 18, 1960 |